Dec. 1, 1970   J. O. HAYES   3,544,130
IMPLEMENT FRAME
Filed Oct. 14, 1968   2 Sheets-Sheet 1

*INVENTOR.*
JOHN O. HAYES

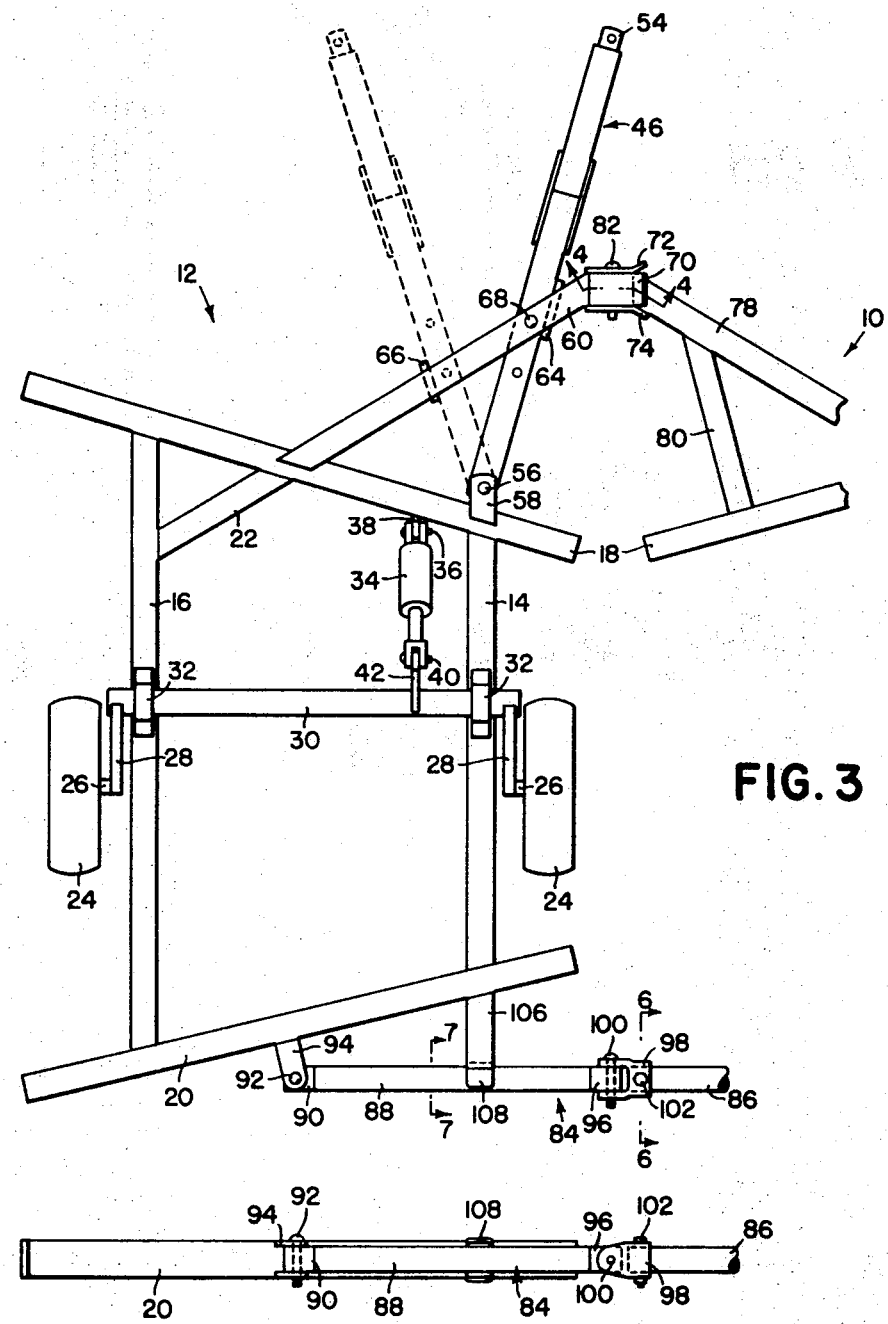

United States Patent Office 3,544,130
Patented Dec. 1, 1970

3,544,130
IMPLEMENT FRAME
John Oscar Hayes, Urbana, Ill., assignor to Deere & Company, Moline, Ill., a corporation of Delaware
Filed Oct. 14, 1968, Ser. No. 767,180
Int. Cl. B62d 53/00
U.S. Cl. 280—412
15 Claims

ABSTRACT OF THE DISCLOSURE

An agricultural implement frame having two independently supported subframes movable between a side-by-side position for normal field-working purposes, and a fore-and-aft position wherein one of said subframes is adapted to trail behind the other for transport purposes. Front and rear connections between the two subframes are provided, the rear connection, comprising an elongated link member which, in conjunction with the front connection, serves to maintain the subframes in side-by-side relation when the implement frame is in its field-working position, and, when the front connection is released serves as a connecting link between the subframes when the implement frame is in its transport position.

BACKGROUND OF THE INVENTION

The present invention relates generally to agricultural implements and more particularly to a framework for agricultural implements movable between a wide field-working position and a narrow transport position.

One of the current trends in farm equipment is toward larger and wider ground-working implements whereby a strip of maximum width can be worked on each pass through the field. Although the maximum working width of such implements is primarily limited only by the ability of the tractor to pull it through the ground, the maximum transport width is limited by the width of existing roadways, gateways, and the like. It is thus desirable to provide an implement frame having a substantial operating or working width, yet one which, at the same time may be converted to a narrower width suitable for transport purposes. Although a number of attempts have heretofore been made to provide such an implement frame, these prior art devices are in general characterized by excessive complexity, prohibitive cost, and undue difficulty of operation.

SUMMARY OF THE INVENTION

The implement frame of the present invention includes, generally, a pair of independently supported subframes adapted to travel in side-by-side relation for normal operational or field-working purposes, and in fore-and aft relation for transport purposes. Each of the subframes is supported by a pair of vertically movable wheels which are operable to raise and lower the subframes in unison.

The subframes are held in their side-by-side field-working position by means of a single releasable connection between their forward portions, and an elongated link member extending between their rear portions. The right and left ends of the rear link member are mounted for pivotal movement about a generally vertical axis on the respective subframes. The implement frame is converted from its field-working position to its transport position by releasing the front connection and allowing the subframes to assume a fore-and-aft position wherein the rear or trailing subframe is linked with the front subframe solely by means of the rear link member. The implement frame is attachable to a tractor by means of a hitch member adjustably mounted on the front subframe for movement between field-working and transport positions.

BRIEF DESCRIPTION OF THE DRAWINGS

FIG. 3 is an enlarged plan view of the left subframe of the implement frame.

FIG. 5 is a partial view of the implement frame taken from the rear, showing the rear link member.

DESCRIPTION OF THE PREFERRED EMBODIMENT

In the following description, right- and left-hand reference is determined by standing at the rear of the implement frame and facing in the direction of travel.

Figure 1:
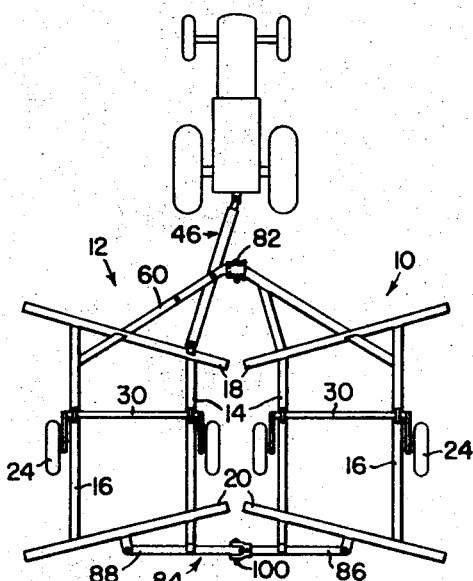
FIG. 1 is a plan view of the implement frame of the present invention in its field-working or normal operating position.
Figure 2:
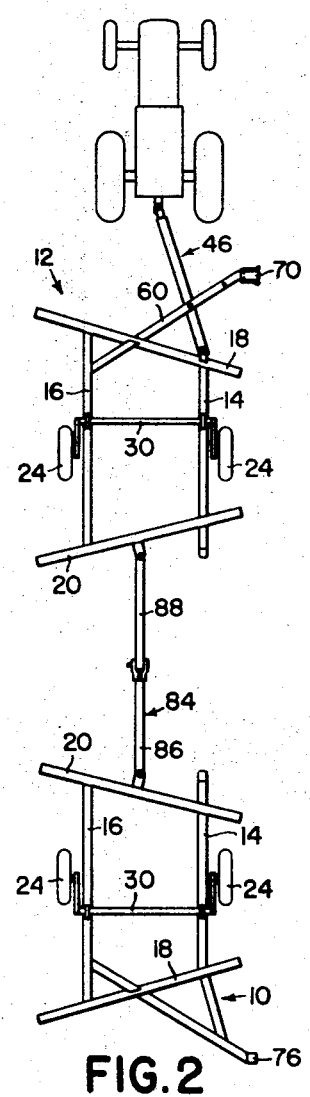
FIG. 2 is a plan view of the implement in its transport position.

Referring now to the drawings, the implement frame of the present invention includes, generally, right and left subframes 10 and 12, respectively, which are adapted to travel in side-by-side relation for field-working purposes, illustrated in FIG. 1, and in fore-and-aft relation for transport purposes, illustrated in FIG. 2. As is apparent from the drawings, the two subframes 10 and 12 are essentially mirror images of one another, with certain exceptions which will be noted in the following description.

As shown best in FIG. 3, each subframe includes an inner and outer, longitudinally extending side frame members 14 and 16, respectively, each of which rigidly connects the inner and outer end portions of fore-and-aft, diagonally extending toolbar members 18 and 20 respectively. Front toolbar 18 is braced to the forward portion of side member 16 with short brace member 22. Although not shown in the drawings, a variety of earth-working tools such as disk gangs, cultivator shovels and the like, can be mounted on toolbars 18 and 20.

Each subframe 10, 12 is supported by a pair of ground wheels 24 disposed outwardly from side members 14, 16. Ground wheels 24 are mounted for rotational movement on stub axles 26 which are in turn rigidly fixed to the lower end of ground wheel support arms 28. A transversely extending rockshaft 30, journaled to the top side of members 14, 16 with U-shaped bearing caps 32, has support arms 28 rigidly secured to its ends and extending radially therefrom in parallel relation. A hydraulic cylinder assembly 34, supplied with hydraulic fluid under pressure from the hydraulic system of the tractor, is provided to rotate rockshaft 30 and thus raise and lower the subframes 10, 12 relative to the ground. The stationary or cylinder portion of cylinder assembly 34 is pivotally mounted by means of pin 36 on bracket 38 which is in turn rigidly fixed to the back side of toolbar member 18. The movable or piston end of cylinder assembly 34 is pivotally attached by means of pin 40 to the outer end of lift arm 42 which in turn is rigidly secured to and extends radially from rockshaft 30.

It should be apparent from the mechanism described that when cylinder assembly 34 is fully retracted, ground wheels 24 will be in their uppermost position, and the implement frame will be in its lowered or field-working position. Conversely, when cylinder assembly 34 is fully extended, ground wheels 24 will be in their lowermost position, and the implement frame will be in its raised or transport position. The hydraulic cylinder assemblies 34 of subframes 10, 12 are connected with each other and with the hydraulic system on the tractor by means of hydraulic fluid hoses (not shown), preferably in a series arrangement whereby the fluid which is displaced from one cylinder assembly is introduced into the other. Such an arrangement insures that both subframes 10 and 12 will be raised and lowered in unison.

Figure 8:
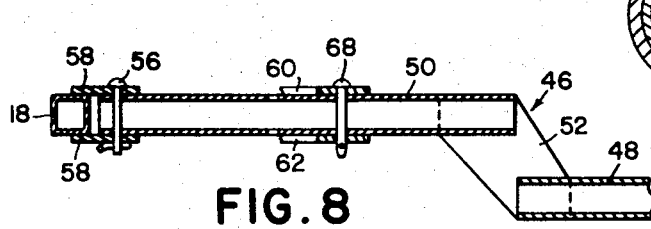
FIG. 8 is a section view of the hitch member taken along the line 8—8 of FIG. 3.

As shown best in FIGS. 1–3, the implement frame of the present invention is attachable to a tractor by means of hitch member 46, pivotally mounted on left subframe 12 for movement between a field-working position, illustrated by the solid lines of FIG. 3, and a transport position, illustrated by the phantom lines of FIG. 3. Hitch member 46, illustrated in detail in FIG. 8, is composed of fore-and-aft members 48 and 50, respectively, which are rigidly connected in vertical offset relation by means of side plates 52. The forward end of member 48 has a hitch clevis 54 mounted therein for receiving a tractor drawbar. The rearward end of member 50 is pivotally mounted on pin 56 between upper and lower supports 58, which are in turn fixed to the top and bottom surfaces, respectively, of toolbar 18. Member 50 extends forwardly from this pivotal connection between upper and lower diagonally extending hitch member support arms 60 and 62 respectively. The range of horizontal swinging movement of hitch member 46 about pin 56 is defined by right and left stop blocks 64 and 66, respectively, rigidly mounted between support arms 60, 62. Left stop block 66 locates the transport position of hitch member 46, while right stop block 64 locates the field-working position of the hitch member. Pin 68, in cooperation with aligned holes in member 50 and support arms 60, 62, serves to lock hitch member 46 in either position.

Figure 4:
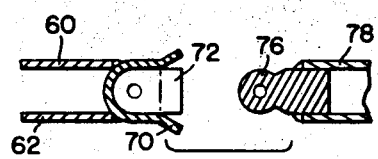
FIG. 4 is a section view of the front connection between the two subframes, taken along the line 4—4 of FIG. 3.
Figure 7:
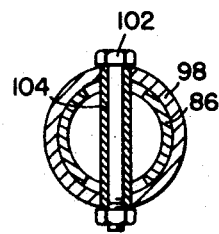
FIG. 7 is a section view taken along the line 7—7 of FIG. 3.

The front portions 18 of the subframes 10 and 12 are provided with a single pivotal connection, shown best in FIGS. 3 and 4. Receiving bracket 70, having upper and lower flanged portions, is rigidly secured to the outer ends of support arms 60 and 62 on left subframe 12. Fore-and-aft flanged plates 72 and 74, respectively, enclose the ends of bracket 70. Cooperating with receiving bracket 70 and flanged plates 72, 74 to complete the front connection between subframes 10 and 12 is cylindrical block 76 rigidly fixed to the outer end of arm 78, which extends diagonally from front toolbar 18 of right subframe 10 and is braced therewith by means of brace member 80. Block 76 is pivotally mounted within bracket 70 on pin 82, which is received by longtiudinally aligned apertures in fore-and-aft flanged plates 72, 74 and block 76.

The rear sides or toolbars 20 of subframes 10 and 12 are connected by means of an elongated link member 84 whose ends, as shown best in FIGS. 3 and 5, are mounted on the midportions of rear toolbars 20 for pivotal movement about a vertical axis. Link member 84 includes right and left members 86 and 88, respectively, whose outer ends have pivot blocks 90 rigidly secured thereto. Blocks 90 are mounted on pins 92 between the upper and lower legs of mounting brackets 94, which are in turn rigidly fixed to the back sides of toolbars 20. Pivot block 96, rigidly secured to the inner end of left member 88, is received between the legs of bracket 98 and pivotally mounted therein on pin 100. As shown in FIG. 3, pin 100 in link member 84 and pin 82 in the front subframe connection define a longitudinal axis about which subframes 10 and 12 are free to pivot when in their side-by-side field-working position. The implement frame and any ground-working tools mounted thereon are thus able to more nearly conform to the surface of the ground.

Figure 6:
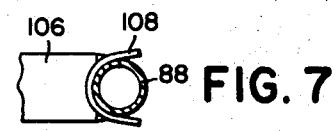
FIG. 6 is a section view taken along the line 6—6 of FIG. 3.

The inner end of right member 86 is retained within a matching cylindrical recess in bracket 98 by means of bolt 102 and bushing 104. As shown in detail in FIG. 6, member 86 is provided with a pair of transversely elongated slots for receiving bolt 102 and bushing 104, and it is thus free to rotate in a limited range with respect to bracket 98. Subframes 10 and 12 are, accordingly, free to rotate with respect to each other about a longitudinal axis when in their fore-and-aft transport position.

Struts 106, having U-shaped stop members 108 mounted on their rearward ends, are rigidly attached to and extend rearwardly from toolbars 20 on each of the subframes 10 and 12. Stop members 108 serve to restrict the pivotal movement of subframes 10 and 12 with respect to link member 84, thus insuring that the front connection between the subframes is properly aligned when the implement frame is converted from its transport position back to its field-working position, as will be more fully explained below.

When the implement frame is in its normal working position, illustrated in FIG. 1, the subframes 10, 12 are held in side-by-side relation by the above-described fore-and-aft connections, and hitch member 46 is locked against right stop block 64 such that hitch clevis 54 lies on the longitudinal center line of the implement frame. In this position the front and rear connections allow the subframes to pivot with respect to each other about the same longitudinal center line to accommodate undulations in the surface of the ground. When in its transport position, illustrated in FIG. 2, hitch member 46 of the implement frame is locked against left stop block 66 such that hitch clevis 54 lies approximately on the longitudinal center line of left subframe 12, and subframe 10 is disposed in trailing position directly behind subframe 12. In this position, rear connecting member 84 allows universal relative movement between the two subframes.

The procedure for changing the implement frame from its field-working position of FIG. 1 to its transport position of FIG. 2 involves a minimum of time and effort. Starting in the field-working position, the implement frame must first be raised to its transport height by extending cylinder assemblies 34. Next, pin 68, holding hitch member 46 in position against right stop block 64, and pin 82, connecting the forward portions of the subframes 10 and 12, are removed and the tractor is driven forwardly and to the left. This movement will cause hitch member 46 to swing to the left against left stop block 66, where it is then secured by means of pin 68, and right subframe 10 to swing outwardly from left subframe 12. Continued forward movement of the tractor will cause subframe 10 to eventually assume the position directly behind subframe 12 illustrated in FIG. 2.

The procedure for changing the implement frame from its transport position back to its ground-working position involves essentially the same steps outlined above, though in reverse order. Pin 68 is first removed from hitch member 46 and the tractor is backed such that its drawbar moves to the right. This will cause hitch member 46 to swing back against right stop block 64 where it is then locked with pin 68. Continued movement of the tractor in this direction will cause subframe 12 to continue to pivot with respect to rear link member 84 until it is restricted by engagement with stop member 108. Right subframe 10 will continue to pivot with respect to member 84 until it reaches its proper position alongside left subframe 12, whereupon stop member 108 will restrict it too from further pivotal movement. As the front portions of the subframes 10, 12 approach each other, the upper and lower flanged portions of bracket 70, and flanged plates 72, 74 on left subframe 12 will guide cylindrical block 76 on right subframe 10 into its proper centered position whereupon pin 82 may be reinserted to securely connect the two subframes.

A significant feature of the present invention resides in the fact that the left subframe 12 is essentially a self-contained frame unit, and it thus may be completely disconnected from the right subframe and used separately, as an offset disk harrow, for example. It would be necessary merely to remove pin 82 from the front connection, remove rear connecting member 84, and secure hitch member 46 in its normal transport position. Right subframe 10 could likewise be utilized as a separate unit with the addition of a suitable hitch device.

An additional feature of the invention resides in the fact that two existing implement frames, such as two offset disk harrows, for example, may be utilized as the basic subframe components. The additional elements required, such as the swingable hitch member and the fore-and-aft connections, could be provided as an attachment for such existing frames.

I claim:

1. An implement frame comprising: a pair of subframes; link means pivotally connecting said subframes and operative in response to a moving force acting on one of the subframes to move the subframes relative to each other between an operating position wherein said subframes are disposed in side-by-side relation, and a transport position wherein said subframes are disposed in fore-and-aft relation; connection means acting between the subframes to releasably maintain the subframes in said operating position; hitch means mounted on one of the subframes and including an elongated hitch member having tractor attaching means at one of its ends, said hitch member being pivotally mounted on the forward portion of said one subframe and swingable between a first position, wherein said attaching means lies generally on the longitudinal centerline of the implement frame when said implement frame is in its operating position, and a second position, wherein said attaching means lies generally on the longitudinal centerline of the implement frame when said implement frame is in its transport position.

2. An agricultural implement frame comprising: a pair of subframes having front and rear portions; link means pivotally connecting said rear portions and operative in response to a moving force acting on one of the subframes to move the subframes relative to each other between a wide operating position, wherein said subframes are disposed in side-by-side relation, and a narrow transport position, wherein said subframes are disposed in fore-and-aft relation with the rear subframe turned 180° relative to its operating position; connection means acting between said forward portions to releasably maintain the subframes in said operating position; means on each of the subframes for mounting ground working tools thereon; and means on each of the subframes for raising and lowering said ground working tools.

3. The implement frame described in claim 2 further including hitch means mounted on the forward portion of one of the subframes and including tractor attaching means shiftable between a first position, wherein said tractor attaching means lies generally on the longitudinal centerline of the frame when said frame is in its operating position, and a second position, wherein said tractor attaching means lies generally on the longitudinal centerline of the frame when said frame is in its transport position.

4. The implement frame described in claim 3 wherein said hitch means includes an elongated hitch member having said tractor attaching means on one of the ends, said hitch member being swingably mounted on the respective subframe at its other end to shift said tractor attaching means between said first and second positions.

5. The implement frame described in claim 2 wherein said link means includes means permitting universal relative movement between the subframes when the implement frame is in said transport position.

6. The implement frame described in claim 2 wherein said link means and said connection means includes means cooperating to permit each of said subframes to pivot independently about a longitudinally extending axis when the implement frame is in said operating position.

7. The implement frame described in claim 2 wherein said connection means includes a first portion mounted on one subframe; a second portion mounted on the other subframe and receivable by said first portion, and guide means associated with one of said portions to guide the other portion into proper vertical relation therewith.

8. The implement frame described in claim 2 wherein said connection means includes a first portion mounted on one subframe; a second portion mounted on the other subframe and receivable by said first portion, and guide means associated with one of said portions to guide the other portion into proper fore-and-aft relation therewith.

9. A transversely elongated implement frame including a pair of subframes normally disposed in transverse side-by-side relation and each having a transversely extending rear side; elongated link means having end portions connected respectively to the rear sides of said subframes for pivotal movement about generally vertical axes on the respective subframes, said vertical axes being located on the respective rear sides substantially centrally thereof; and connection means between the two subframes to hold said subframes in their side-by-side position, said connection means being releasable to permit one subframe to turn 180° and assume a position trailing the other subframe in response to relative fore-and-aft movement between the subframes.

10. The implement frame described in claim 9 wherein one subframe has a draft member extending forwardly thereof which is adapted at its forward end for connection to a draft vehicle.

11. The implement frame described in claim 10 in which said draft member is adjustable laterally on the respective subframe whereby the forward end may be positioned centrally forwardly of the subframe and centrally between the subframes when they are in side-by-side position.

12. The implement frame described in claim 9 in which the connection means provides an articulate connection between the subframes along a fore-and-aft extending axis, and the link means includes a pair of links having adjoining ends articulately connected along the same axis when the subframes are in side-by-side disposition.

13. The implement frame described in claim 9 wherein each of said subframes includes means to restrict the pivotal movement of said subframe with respect to said elongated link means when said elongated link means is disposed in its normal position relative to said subframe.

14. An implement frame comprising: a pair of subframes having front and rear portions; link means pivotally connecting said rear portions and operative in response to a moving force acting on one of the subframes to move the subframes relative to each other between a wide operating position, wherein said subframes are disposed in side-by-side relation, and a narrow transport position, wherein said subframes are disposed in fore-and-aft relation with the rear subframe turned 180° relative to its operating position; connection means acting between said forward portions to releasably maintain the subframes in said operating position, and hitch means mounted on one of said subframes and including tractor attaching means shiftable between a first position, wherein said tractor attaching means lies generally on the longitudinal centerline of the frame when said frame is in its operating position, and a second position, wherein said tractor attaching means lies generally on the longitudinal centerline of the frame when said frame is in its transport position.

15. The implement frame described in claim 14 wherein said hitch means includes an elongated hitch member having said tractor attaching means on one of its ends, said hitch member being swingably mounted on the respective subframe at its other end to shift said tractor attaching means between said first and second positions.

References Cited

UNITED STATES PATENTS

| | | | |
|---|---|---|---|
| 1,413,575 | 4/1922 | Cochran | 280—411(.3)UX |
| 3,064,996 | 11/1962 | Roppel | 280—412 |
| 3,414,064 | 12/1968 | Foster | 172—311 |

LEO FRIAGLIA, Primary Examiner

U.S. Cl. X.R.

172—311